United States Patent [19]

Föhl

[11] 4,399,655

[45] Aug. 23, 1983

[54] PYROTECHNICAL DRIVING DEVICE ESPECIALLY FOR A RETIGHTENING DEVICE OF A SAFETY BELT SYSTEM

[75] Inventor: Artur Föhl, Schorndorf, Fed. Rep. of Germany

[73] Assignee: REPA Feinstanzwerk GmbH, Alfdorf, Fed. Rep. of Germany

[21] Appl. No.: 301,045

[22] Filed: Sep. 10, 1981

[30] Foreign Application Priority Data

Sep. 11, 1980 [DE] Fed. Rep. of Germany ....... 3034257

[51] Int. Cl.³ ........................................... F01B 29/08
[52] U.S. Cl. .................................................. 60/637
[58] Field of Search ......................................... 60/637

[56] References Cited

U.S. PATENT DOCUMENTS

| | | | |
|---|---|---|---|
| 2,674,852 | 4/1954 | Olman | 60/637 |
| 2,736,522 | 2/1956 | Wilson | 60/637 |
| 3,149,456 | 9/1964 | Sterrett | 60/637 |
| 3,484,846 | 12/1969 | Hosman et al. | 60/637 |

Primary Examiner—Wendell E. Burns
Attorney, Agent, or Firm—Herbert L. Lerner; Laurence A. Greenberg

[57] ABSTRACT

Pyrotechnical driving device especially for a back-tightening device of a safety belt system with a cartridge containing a propellant charge, preferably a solid propellant charge. The cartridge is connected to a cylinder which contains a driving piston. The cartridge is separated from the piston by a rupture plate which is ruptured after the propellant charge is activated and after which the driving piston is accelerated. The rupture plate is followed directly by a form-stable nozzle plate which has a nozzle opening which is narrower as compared to the rupture plate.

12 Claims, 4 Drawing Figures

PYROTECHNICAL DRIVING DEVICE ESPECIALLY FOR A RETIGHTENING DEVICE OF A SAFETY BELT SYSTEM

BACKGROUND OF THE INVENTION

1. Field of the Invention

The invention relates to a pyrotechnical driving device, especially for a back-tightening device of a safety belt system, with a cartridge containing a propellant charge, preferably a solid propellant charge which is connected to a cylinder which contains a driving piston and is separated from the charge by a bursting plate which is ruptured after the propellant charge is activated and accelerates the driving piston.

2. Description of the Prior Art

A cartridge containing a propulsion charge is connected tightly to a cylinder, for instance to an elongated cylinder tube, and contains a piston which can be moved axially along the cylinder. If a curved cylinder is used, a spherical piston is guided in the cylinder. The space containing the propulsion charge is separated from the cylindrical space by a bursting bottom which may be integrally connected to the cartridge, or a disc-like cross section, which after the propulsion charge has been fired and at the predetermined pressure is ruptured, whereupon the pressure can act unimpeded on the piston. The cartridge is preferably made of a metallic material. When the bursting plate is ruptured, its effect is to cause a large pressure drop to take plate immediately. Because of this large pressure drop complete combustion of the solid propellant is not effected and complete chemical conversion of the energy contained in the unactivated propellant into acceleration energy for the piston does not occur. The possibility exists of making the rupture plate much thicker so that it is ruptured only at a much higher pressure. However, in this case considerable energy is used for the rupture energy which then is no longer available for the driving power of the pyrotechnical driving device.

SUMMARY OF THE INVENTION

An object of the invention is to provide a more efficient pyrotechnical driving device of simple design of the type mentioned at the outset in which a substantial improvement in utilization of energy for driving the pyrotechnical device is obtained.

With the foregoing and other objects in view, there is provided in accordance with the invention a pyrotechnical driving device, including a pyrotechnical driving device for a back-tightening device of a safety belt system comprising a cartridge containing a propellant charge, a cylinder which contains a driving piston, said cartridge connected to said cylinder, a rupture plate interposed between the propellant charge and the piston, which plate is ruptured due to a pressure increase against the plate after the propellant charge is activated, the combination thereof of a form-stable nozzle plate directly following the rupture plate, said form-stable nozzle plate having a nozzle opening which opening is narrower compared to the rupture plate to prevent occurrence of a sudden pressure drop through the rupture plate.

Other features which are considered as characteristic for the invention are set forth in the appended claims.

Although the invention is illustrated and described herein as embodied in a pyrotechnical driving device especially for a retightening device of a safety belt system, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

Figure 1:
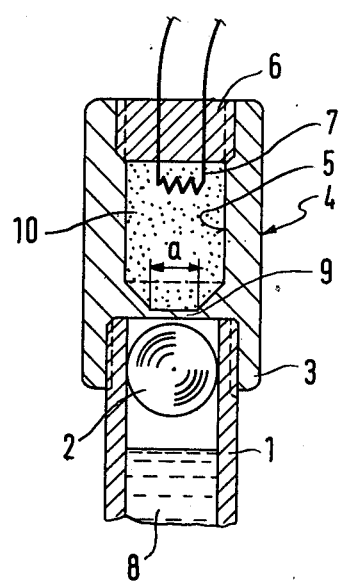
FIG. 1 shows a cross-sectional view of a pyrotechnical driving device in accordance with the state of the art showing conventional use of a rupture plate.

The driving device according to FIG. 1 consists basically of a tubular cylinder 1 in which a spherical piston 2 is guided in a sealed condition. Screwed onto the free end of the cylinder 1 is a cartridge 4 provided with a screw cap 3 which has a cylindrical metallic part and a hole 5 closed off by the closing plug 6. An electrically actuatable fuse extends through the closing plug 6 into the hole 5. The cartridge 4 is screwed on the free end of the cylinder 1 to seal it thereby and has, as a partition between the hole 5 and the cylinder space 8, a bursting or rupture plate 9. Plate 9 with its diameter a represents an intended rupture point of the cartridge 4 which breaks or ruptures after ignition of a propellant charge contained in the hole 5 of the cartridge 4, for instance of a solid propellant charge 10, by the fuse 7, the followed by chemical reaction of the solid propellant 10 to gaseous form at a predetermined pressure. A large pressure drop takes place immediately with the effect that the chemical conversion of the solid propellant 10 no longer continues to completion, i.e. the solid propellant can no longer burn up completely to give off gas. The gas pressure generated by the firing of the propellant charge 10 acts on the spherical piston 2 and causes it to be accelerated. The spherical piston 2 is moved along the cylinder 1 and is provided, for instance, for actuating one of a known back-tightening devices of a safety belt system. The triggering of the fuse 7 also takes place in known manner if an unusual acceleration of the motor vehicle in which the safety belt system is installed takes place, for instance in the event of a crash.

Figure 2:
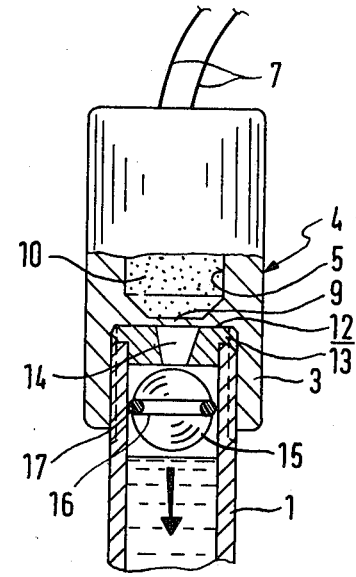
FIG. 2 illustrates in a partial cross-sectional view, a first embodiment of the pyrotechnical driving device according to the invention, wherein a metallic nozzle plate is interposed between the rupture plate and the cylinder.
Figure 3:
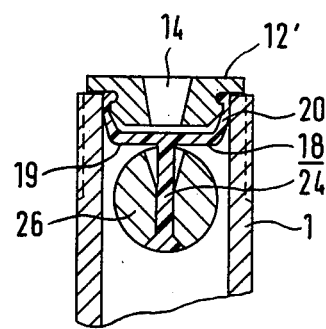
FIG. 3 shows a second embodiment of the pyrotechnical driving device according to the invention in which a cup-shaped sealing sleeve is attached to the spherical portion and the rim of the cup forms a seal between the nozzle and the cylinder.
Figure 4:
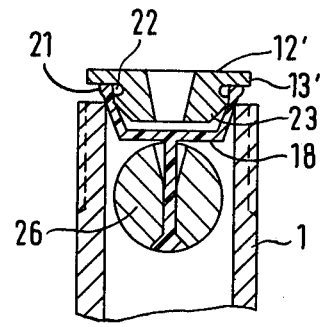
FIG. 4 is the same as FIG. 3 except that the nozzle is shown in position just before being further inserted to complete the seal.

In the embodiment example according to claim 2, a cylinder 1 is tightly connected through a screw connection 3 to a cartridge 4 which contains a solid propellant charge 10 and which, before the system is activated, i.e. before the fuse 7 fires, has a thin closed bursting plate 9 which separates the hole 5 hermetically from the cylinder 1. A metallic nozzle plate 12 rests with a flange 13 on the end wall of the tubular cylinder 1 and has a nozzle opening 14. This nozzle opening has a funnel-like cross section with a width of the entrance side resting against the rupture plate 9, which corresponds approximately to the diameter a of the bursting plate 9 and with a width on the exit side which is smaller than the width (diameter) of the rupture plate 9. The nozzle plate 12 is pressed by the cartridge 4 against the cylinder in a sealing manner. Also in this embodiment example, a spherical piston 15 is used. The diameter of this spherical piston 15 is smaller than the smallest inside width of the curved cylinder 1 (not shown) and has an annular sealing element 17 which is resiliently guided in a radial slot 16 of the spherical piston 15. The reason for such design of the piston is the fact that the curved cylinder as a rule has a shape which deviates from the circular shape, for instance a slightly ovate cross-sectional shape, which usually cannot be avoided for production reasons. The sealing element 15 rests tightly against the inside wall of the cylinder and can adapt itself to a changed cross-sectional shape in the region of the curvature. After the solid propellant charge 10 has been ignited and after the bursting of the rupture plate 9, the fluid from the bursting plate must be forced through the narrowed nozzle opening 14, so that a sudden pressure drop, as in the described state of the art, does not occur, i.e. a delay takes place that complete conversion, for instance, of the solid propellant 10 occurs. The piston is therefore driven with optimum gas action, i.e. with high efficiency, forward in the direction of the arrow. As compared to the embodiment example according to FIG. 2, the design of the piston is different in the embodiment example according to FIGS. 3 and 4, by virtue of an additional element which performs the holding and sealing function. A nozzle plate 12' is pressed by the cartridge 4 not shown here but seen in FIG. 2, against the end wall of the cylinder 1. A substantially cup-shaped sealing sleeve 18 consists of an elastically resilient material. The sealing sleeve 18 with a substantially flat bottom part 19 and a cup-shaped, curved and preferably funnel-like rim 20, enclosing the exit side of the nozzle plate 12'. The free boundary of the rim 20 has a circular bead 21. FIG. 4 particularly shows a partially separated view of the pyrotechnical driving device according to FIG. 3, with the nozzle plate 12', the circular slot 22 directly adjoining the flange 13' as well as a section 23 narrowed down in funnel-fashion, where the rim 20 with its bead 21 is clamped into the circumferential slot 22 when the nozzle plate 12' is pressed onto the cylinder 1 (FIG. 3). Thus, the sealing sleeve 18 has a sealing function and because it is connected via a post 24 to a spherical piston 26 which is provided for this purpose with a funnel-like tapered axial hole, also has a holding function with respect to the piston. In the embodiment example, the wall thickness of the rim 20 immediately adjacent to the head 21 is smaller than the wall thickness of the bottom part 19 of the sealing sleeve 18, so that, after rupture of the bursting plate 9 and under the action of pressure, the sealing sleeve 18 is torn off at this intended rupture point. The remaining cup-shaped rim rests tightly against the inside surface of the cylinder 1, and because of this, the spherical piston 26 may have a design as in FIG. 2, which has a smaller diameter than the smallest inside width of the curved cylinder 1. Thus, the piston can pass through the curved cylinder section with very little friction, the taken-along sealing sleeve taking care that no detrimental leakage point and therefore detrimental pressure loss takes place. On the other side, i.e. in the vicinity of the nozzle plate 12', the bead 21 which is formed into the circular slot during the installation and fills out the circular slot, assure preservation of complete sealing of the system until emergency rupture conditions occur as in an auto crash.

I claim:

1. Pyrotechnical driving device, including a pyrotechnical driving device for a back-tightening device of a safety belt system, comprising a cartridge containing a propellant charge, a cylinder which contains a driving piston, said cartridge connected to said cylinder, a rupture plate interposed between the propellant charge and the piston, which plate is ruptured due to a pressure increase against the plate after the propellant charge is activated, the combination thereof of a form-stable nozzle plate directly following the rupture plate, said form-stable nozzle plate having a nozzle opening which opening is narrower compared to the rupture plate to prevent occurrence of a sudden pressure drop through the rupture plate.

2. Pyrotechnical driving device according to claim 1, wherein the propellant charge is a solid.

3. Pyrotechnical driving device according to claim 1, wherein the nozzle opening has a funnel-shaped cross section with a diameter at the entrance side resting against the rupture plate which corresponds approximately to the diameter of the rupture plate and with a diameter on the exit side which is smaller than the diameter of the rupture plate.

4. Pyrotechnical driving device according to claim 1, wherein the nozzle plate closes off the cylinder tightly.

5. Pyrotechnical driving device according to claim 4, wherein the nozzle plate is screwed onto the cylinder.

6. Pyrotechnical driving device according to claim 4, wherein a cup-shaped sealing sleeve of resilient material encloses the exit side of the nozzle plate and the cup-shaped rim is clamped between the nozzle plate and the cylinder to form a seal.

7. Pyrotechnical driving device according to claim 6, wherein the rim of the sealing sleeve is clamped in a circumferential slot of the nozzle plate and is held there.

8. Pyrotechnical driving device according to claim 7, wherein the rim is strengthened.

9. Pyrotechnical driving device according to claim 6, wherein the sealing sleeve has an intended rupture point in the rim region.

10. Pyrotechnical driving device according to claim 7, wherein the sealing sleeve has an intended rupture point in the rim region.

11. Pyrotechnical driving device according to claim 9, wherein the cup rim of the cup-like sealing sleeve has a smaller material thickness than the thickness on the bottom on the cup.

12. Pyrotechnical driving device according to claim 6 or claim 7 or claim 9, wherein the piston is a spherical piston, and wherein the cup-shaped sealing sleeve is connected to the spherical piston, the diameter of which is smaller than the smallest inside width of the cylinder.

* * * * *